: 3,424,599
Patented Jan. 28, 1969

3,424,599
WAX MIXTURES AND PROCESS FOR THE PRODUCTION OF WAX MIXTURES, FOR FLUID, WATER-FREE POLISH MASSES
Josef Kaupp and Werner Strassberger, Gersthofen, near Augsburg, Germany, assignors to Farbwerke Hoechst Aktiengesellschaft vormals Meister Lucius & Bruning, Frankfurt am Main, Germany, a corporation of Germany
No Drawing. Filed May 7, 1965, Ser. No. 454,165
Claims priority, application Germany, May 22, 1964,
F 42,950
U.S. Cl. 106—10    9 Claims
Int. Cl. C09g 1/08; C09d 3/60; C08h 9/06

ABSTRACT OF THE DISCLOSURE

A process for producing waxes suitable for fluid, water-free polish masses by admixing
(1) wax acids obtained from Guerbet alcohols of 24–60 carbon atoms or the corresponding soaps obtained by neutralizing the wax acids with oxides or hydroxides of a metal of Groups I–III of the Periodic Table with
(2) at least one of a paraffin, polyethylene wax or ozocerite; effecting the admixture in the molten state.

---

Polishes for floor coverings, furniture or motorcars on the basis of water-free, fluid polish masses have gained a growing importance. The advantage of such water-free fluid polish masses, in comparison with the known water-containing bright-drying polish emulsions or the solvent-containing pastes, lies, on the one hand, in their substantially higher cleaning efficiency and, on the other hand, in their simple use since they can be applied either by hand or mechanically, e.g. by spraying.

These fluid polish masses usually contain between 10 and 20% of solids and, correspondingly, between 90 and 80% of wax solvents. Since, however, the commercial ester waxes, e.g. carnauba wax, or the partly synthetic ester waxes on the basis of crude montan wax form dimensionally stable pastes at room temperature, either solely or in admixture with hard paraffin, because of their good oil binding properties, it is necessary to add fluidizing agents for getting thinly liquid polish masses having a low solidification point.

In German patent specification 1,007,911 the production of such waxes for the manufacture of water-free, fluid polish masses is described. The olefin-paraffin mixture produced from cake paraffin which was obtained from petroleum by chlorination and dehydrochlorination is treated with water gas in the presence of a catalyst. The aldehyde-paraffin mixture resulting therefrom is hydrogenated to the alcohol which is then reacted to the corresponding mixture of wax acid and paraffin by melting with caustic potash, and the reaction product is subsequently decomposed with dilute acids.

By partial saponification with caustic lime or—according to German patent specification 1,123,783—with the oxides or hydroxides of sodium, potassium, barium or strontium, a final product is obtained which contains 45% of paraffin, 25% of free wax acid and 30% of lime-soaps, or 50% of paraffin, 25% of free wax acid and 25% of sodium soaps, respectively.

By mixing these partly saponified wax acid-paraffin mixtures with hard paraffin from the catalytic carbon oxide hydrogenation and by dissolving the mixture obtained in a solvent or solvent mixture water-free, fluid polish masses can be produced.

Furthermore, waxes for fluid polish masses are known which—according to German patent specification 1,011,-872—consist of highly branched esters or polymerized vinyl ethers of fatty and waxy alcohols.

Now, it has been found that waxes which are especially suitable for the production of water-free, fluid polish masses can be obtained from branched wax acids with 24 to 60 carbon atoms prepared from the corresponding Guerbet alcohols with 24 to 60 carbon atoms, or their soaps by admixing 1 to 7.5 parts, preferably 5 parts, of paraffin and/or polyethylene wax and/or microcrystalline wax. It is of special advantage to neutralize the branched wax acids before mixing with 0.7 to 1 equivalent, preferably 0.75 to 1 equivalent, of the oxides or hydroxides of the alkali and/or alkaline earth metals.

The branched wax acids are produced in known manner: high molecular weight, straight-chained alcohols are subjected to condensation in the presence of an alkaline catalyst and under an inert gas atmosphere at 280 to 300° C. according to Guerbet. After a reaction time of 5 to 6 hours the Guerbet-alcohols are formed which are alkylated in 2-position. ((Compt. rend. Acad. Sci., volume 128, page 511 (1898); volume 146, page 300, page 1045 (1908); volume 149, page 129 (1909). Weizmann: Chemistry and Industry (June 1937), pages 587 to 591)).

The conversion of the branched alcohols into the corresponding acids is performed in known manner by melting with caustic potash. The alcohol is mixed with 150 to 200% of the theoretically necessary amount of alkali metal hydroxide and is heated for 7 to 9 hours at 280–320° C., while vigorously stirring. The alkali metal soap resulting therefrom is decomposed by the aid of the corresponding quantity of diluted mineral acid. The remaining traces of mineral acid are removed from the wax acid by repeated boiling with water.

In a simple technical manner the wax acid can be obtained from the alcohols by oxidizing the Guerbet-alcohols with 100 to 150% of the theoretically necessary amount of chromosulfuric acid. The oxidation is carried out under reflux and is finished after 2 to 3 hours. The oxidation product is boiled with diluted sulfuric acid and subsequently treated with water in order to remove the traces of sulfuric acid still contained therein, and an absolutely colorless, very hard acid of waxy character is obtained which corresponds to the starting Guerbet-alcohol..

As starting materials for the production of waxes for fluid, water-free polish masses especially high molecular weight fatty alcohols with 12 to 30 carbon atoms are especially suitable, such as dodecanol, hexadecanol, octadecanol, behenol, furthermore alcohols which are obtained by the air oxidation of paraffinic hydrocarbons with subsequent hydrogenation, or alcohols which are obtained by catalytic addition of ethylene on aluminum trialkyl with subsequent oxidation, or mixtures of these alcohols. As saponification components for the wax acids obtained from the Guerbet-alcohols there can be used the oxides or hydroxides of the metals of the first, second and third group of the Periodic System, preferably of the first and second group, such as sodium, potassium, and/or calcium, the neutralization of the acids being carried out in such a way that 70 to 100%, preferably 75 to 100%, of the acid are neutralized.

For the production of the waxes for water-free, fluid polish masses according to the invention the wax acids obtained from the Guerbet-alcohols and especially their salts are mixed in the molten state with paraffin, polyethylene, wax, and/or microcrystalline waxes.

As paraffins to be admixed especially high molecular weight natural and preferably synthetic hydrocarbons can be used having a solidification point above 70° C., especially above 80° C. and preferably above 90° C. Such hydrocarbons are, e.g. well refined petroleum paraffins or hydrocarbon mixtures from the catalytic hydrogenation of carbon oxide, or wax-like high and low pressure polyolefins, e.g. homo- and copolymers of ethylene or propylene or mixtures thereof with a medium molecular weight below 20,000.

By dissolving the wax mixture in a typical wax solvent, such as turpentine oil or white spirit, or a solvent mixture, and stirring the mixture with usual homogenizers until it has become cold water-free, fluid polish masses of high quality are obtained suitable as polishes, for example for floor coverings. The homogeneous wax suspension produced in this manner possesses an excellent thermostability. The fluid polish masses according to the invention were stored at 0° C. for a prolonged time without solidifying. When measuring the thermostability at 30° C. for 7 days no separation of wax or solvent could be observed. In all cases the fluid polish mass remained thinly liquid and homogeneous and showed uniform structure.

It is of special advantage that great quantities of hard paraffin and/or polyethylene waxes can be admixed. When the polish is applied to the surface to be treated a very hard film is obtained which can be polished to give a high gloss and is relatively insensitive to mechanical influence.

The wax acids produced from the Guerbet-alcohols and their salts are hard products with a penetrometer hardness between 4 and 7 or 3 to 5, respectively, because of their uniform structure. Wax acids which are obtained according to German patent specification 1,007,911 possess quite different properties since, because of the statistic attack of the chlorine on all methylene groups of the paraffin hydrocarbon used, all theoretically possible chloroparaffins are formed in the chlorination and from these a corresponding mixture of isomers of wax acid is obtained. In this case the penetrometer hardness of the mixtures of isomers of wax acids as well as of their soaps is too high for the application of waxes, viz, 45 to 50 or 15 to 25, respectively.

The following examples serve to illustrate the invention but they are not intended to limit it thereto, the parts being by weight unless otherwise stated.

EXAMPLE 1

From commercial stearyl alcohol the Guerbet-alcohol was produced in known manner. 2,500 parts of stearyl alcohol were heated at 290° C. under inert gas atmosphere for 5½ hours in the presence of 15 parts of caustic potash. The reaction product was then boiled with diluted sulfuric acid and subsequently with water until the last traces of mineral acid were removed. After drying an alcohol mixture of about 85% of 2-hexa-decyl-arachic alcohol, 10% of stearyl alcohol and 5% of higher condensed alcohols with the following characteristics: hydroxyl number 123; acid number 8.8; flow point/drop point (according to Ubbelohde) 56.5/56.8° C. was obtained. 1370 parts of this alcohol were oxidized in known manner with 50% of chromo-sulfuric acid. The reaction was finished after 2½ hours. After washing with diluted sulfuric acid and subsequent boiling of the wax acid with water a hard, colorless acid, corresponding to the alcohol, was obtained which had the following characteristics: acid number 122; saponification number 129; hydroxyl number 3.2; flow point/drop point 55.5/56.5° C.; penetrometer hardness 6.

At a temperature of 100 to 150° C. calcium hydroxide was added to the wax acid until neutralization was complete. The penetrometer hardness of the calcium compound was 3.

1.8 parts of this calcium soap were admixed in the molten state with 1.8 parts of hard paraffin having a solidification point above 95° C., 0.7 part of a polyethylene wax, 6.2 parts of a cake paraffin having a solidification point of 52/54° C., and 1.5 parts of an ozocerite. A colorless, very hard wax of a penetrometer hardness of 1 was obtained.

12 parts of this wax composition were treated until melting and admixed, while vigorously stirring, with 88 parts of a solvent mixture heated to a temperature of 70° C. and consisting of 12% of turpentine oil and 88% of white spirit, and cooled, to room temperature while stirring. In this way a thinly liquid, homogeneous, very finely disperse polish mass with excellent thermostability was obtained. After 7 days' testing in cold and heat neither solidification nor separation of solvent could be observed.

EXAMPLE 2

From 3.6 parts of the wax acid according to Example 1, 0.7 part of a polyethylene wax, 1.5 parts of ozocerite and 6.2 parts of cake paraffin having a solidification point of 52/54° C. a light, very hard wax was obtained by mixing these compounds in the molten state. The mixture was dissolved in the heat in 88 parts of white spirit/turpentine oil (88% of white spirit, 12% of turpentine oil) and then cooled, while stirring. A thinly liquid polish mass was obtained which was homogeneous within wide temperature ranges and dried homogeneously when applied to the floor. By slight rubbing a high brightness could be reached.

We claim:
1. A process for producing waxes for fluid water-free polish masses comprising admixing in molten state
   (A) a branched wax acid obtained by melting a straight chain alcohol of about 12–30 carbon atoms in the presence of an alkaline catalyst at about 280–300° C. in an inert atmosphere to obtain a condensed branched alcohol of 24–60 carbon atoms, thereafter heating and reacting said condensed branched alcohol with one of a member selected from the group consisting of caustic potash and chromosulfuric acid; treating and reacting the resulting product with dilute mineral acid, and washing with water; and
   (B) a wax selected from the group consisting of a paraffin, polyethylene wax and ozocerite.

2. The process of claim 1 wherein the (A) wax acid component is obtained by melting a condensed branched alcohol with caustic potash, decomposing the resulting soap with diluted mineral acid and washing with water.

3. The process of claim 1 wherein the wax acid is obtained by reacting the condensed alcohol with chromosulfuric acid, boiling with dilute mineral acid and washing with water.

4. The process of claim 2 comprising treating the (A) wax acid component with about .7 to 1 equivalent of the oxide or hydroxide of alkali or alkaline earth metal before admixing with the (B) component.

5. The process of claim 3 comprising treating the (A) wax acid component with about .7 to 1 equivalent of the oxide or hydroxide of alkali or alkaline earth metal before admixing with the (B) component.

6. A wax for fluid, water-free polish masses consisting essentially of a mixture of
   (A) a branched wax acid, the alkali or alkaline earth metal salt thereof, the wax acid being obtained by condensing a straight chain alcohol of 12–30 carbon atoms at about 280–300° C. in an inert atmosphere in the presence of an alkaline catalyst, converting the resulting condensed branched alcohol of 24–60 carbon atoms to a salt with caustic potash, decomposing with dilute mineral acid and washing; and (B) a wax selected from the group consisting of a paraffin, polyethylene wax and ozocerite.

7. The wax of claim 6 wherein the proportion of (A) to (B) is about 1:5–7.5.

8. A wax for fluid, water-free polish masses consisting essentially of a mixture of
- (A) a branched wax acid, the alkali or alkaline earth metal salt thereof, the wax acid being obtained by condensing a straight chain alcohol of 12–30 carbon atoms at about 280–300° C. in an inert atmosphere in the presence of an alkaline catalyst, oxidizing a resulting condensed branched alcohol of 24–60 carbon atoms with chromosulfuric acid, and washed; and
- (B) a wax selected from the group consisting of a paraffin, polyethylene wax and ozocerite.

9. The wax of claim 8 wherein the ratio of (A) to (B) is about 1:5–7.5.

References Cited

FOREIGN PATENTS 785,444 10/1957 Great Britain.
932,426 9/1955 Germany.

JULIUS FROME, *Primary Examiner.*

JOAN B. EVANS, *Assistant Examiner.*

U.S. Cl. X.R.

106—11, 270, 285; 260—28.5